(12) United States Patent
Bader et al.

(10) Patent No.: US 8,443,654 B2
(45) Date of Patent: May 21, 2013

(54) DEVICE FOR MONITORING THE OBSTRUCTION OF AT LEAST TWO FILTERS OF A FLUID CIRCULATION SYSTEM OF AN AIRCRAFT GAS TURBINE ENGINE

(75) Inventors: Nicolas Alain Bader, Vaux le Penil (FR); Thierry Poix, Dammarie les Lys (FR); Nicolas Potel, Maisons Alfort (FR)

(73) Assignee: SNECMA, Paris (FR)

( * ) Notice: Subject to any disclaimer, the term of this patent is extended or adjusted under 35 U.S.C. 154(b) by 103 days.

(21) Appl. No.: 13/163,141

(22) Filed: Jun. 17, 2011

(65) Prior Publication Data

US 2011/0308306 A1 Dec. 22, 2011

(30) Foreign Application Priority Data

Jun. 18, 2010 (FR) ...................................... 10 54872

(51) Int. Cl.
*G01M 15/14* (2006.01)

(52) U.S. Cl.
USPC ....................................................... 73/112.01

(58) Field of Classification Search
USPC ......................................... 73/112.01, 112.03
See application file for complete search history.

(56) References Cited

U.S. PATENT DOCUMENTS

| | | | | |
|---|---|---|---|---|
| 3,357,236 | A | * | 12/1967 | Kasten ........................... 73/61.73 |
| 4,685,066 | A | | 8/1987 | Hafele et al. |
| 5,239,861 | A | | 8/1993 | Fujita et al. |
| 5,932,795 | A | * | 8/1999 | Koutrakis et al. ............. 73/28.01 |
| 8,007,568 | B2 | * | 8/2011 | DiLeo et al. ...................... 95/19 |
| 8,084,259 | B2 | * | 12/2011 | DiLeo ............................... 436/3 |
| 8,137,983 | B2 | * | 3/2012 | DiLeo ........................... 436/177 |
| 8,147,757 | B2 | * | 4/2012 | DiLeo ........................... 422/68.1 |
| 8,221,522 | B2 | * | 7/2012 | DiLeo et al. ...................... 95/19 |
| 8,261,540 | B2 | * | 9/2012 | Konstandopoulos et al. .. 60/297 |
| 2003/0025598 | A1 | * | 2/2003 | Wolf et al. .................. 340/457.4 |
| 2006/0185446 | A1 | * | 8/2006 | Speckhart ................ 73/862.391 |
| 2007/0240492 | A1 | | 10/2007 | DiLeo et al. |
| 2009/0194485 | A1 | * | 8/2009 | Colotte et al. ................ 210/741 |
| 2011/0016953 | A1 | | 1/2011 | Dileo et al. |
| 2011/0017062 | A1 | | 1/2011 | Dileo et al. |
| 2011/0072789 | A1 | * | 3/2011 | Konstandopoulos et al. .. 60/276 |

FOREIGN PATENT DOCUMENTS

| | | | |
|---|---|---|---|
| EP | 1 844 836 A2 | 10/2007 | |
| EP | 1 886 722 A2 | 2/2008 | |

OTHER PUBLICATIONS

French Preliminary Search Report issued Feb. 4, 2011, in French 1054872, filed Jun. 18, 2010 (with English Translation of Category of Cited Documents).

* cited by examiner

*Primary Examiner* — Freddie Kirkland, III
(74) *Attorney, Agent, or Firm* — Oblon, Spivak, McClelland, Maier & Neustadt, L.L.P.

(57) ABSTRACT

A device monitors an obstruction of two fluid filters of a fluid circulation system of a gas turbine engine of an aircraft. A first obstruction sensor sends a first detection signal of an obstruction of a first filter. A second obstruction sensor sends a second detection signal of an obstruction of a second filter. A processor includes a monitoring input to measure the first and second detection signals. The first obstruction sensor includes a Wheatstone bridge including a strain gauge resistor. The second obstruction sensor is connected in parallel with the strain gauge resistor. The first detection signal is sent over a first predetermined variation range. The second detection signal is sent over a second predetermined variation range, distinct from the first variation range. The processor identifies the obstruction of one of the fluid filters as a function of one of the variation ranges of the detection signals.

6 Claims, 3 Drawing Sheets

DEVICE FOR MONITORING THE OBSTRUCTION OF AT LEAST TWO FILTERS OF A FLUID CIRCULATION SYSTEM OF AN AIRCRAFT GAS TURBINE ENGINE

BACKGROUND OF THE INVENTION

1. Technical Field

The field of the invention is the hydraulic systems of a gas turbine engine of an aircraft.

2. Background Art

A gas turbine engine of an aircraft conventionally comprises several hydraulic systems for conveying fuel or oil to supply the members of the engine.

By way of example, a gas turbine engine includes a hydraulic system through which the fuel runs. In a known manner, the hydraulic system includes a fuel filter set up to catch impurities in the fuel circulating in the system. The fuel filter can only catch a limited quantity of impurities. Once the fuel filter reaches its saturation threshold, the filter is deemed to be obstructed.

In order to ensure the reliability of the hydraulic system, patent application FR2927003A1 filed by the company SNECMA introduced a method for detecting the obstruction of a filter using pressure measurements. Furthermore, an obstruction sensor for monitoring the fuel filter to detect obstruction is known.

Conventionally, an obstruction sensor includes a deformable membrane and a set of strain gauges, also known as strain gauge resistors, which are built into the deformable membrane to form a Wheatstone bridge, known to the person skilled in the art, enabling detection of the pressure difference between the two faces of the deformable membrane and therefore an obstruction of the filter.

In a known manner, the obstruction sensor of the fuel filter is linked to the monitoring input of a processor on board the engine of the aircraft, the processor being known to the person skilled in the art by the English acronym FADEC "Full Authority Digital Engine Control". The processor thereby makes it possible to continuously monitor the state of the fuel filter using the obstruction sensor.

The fuel supply system includes, in addition to the first fuel filter, known as the main fuel filter, a second fuel filter, hereinafter referred to as the auxiliary fuel filter, set up to catch impurities upstream and downstream of the pump in the hydraulic fuel supply system.

BRIEF SUMMARY OF THE INVENTION

Unlike the main fuel filter, the auxiliary fuel filter is not monitored and no obstruction sensor is provided. In order to increase the reliability of the engines, it is proposed to add an obstruction sensor to monitor the auxiliary fuel filter.

Currently, the processor has a single monitoring input to monitor the obstruction sensor of the main fuel filter, known as the main obstruction sensor. Adding an obstruction sensor for the auxiliary fuel filter, known as the auxiliary obstruction sensor, requires the provision of an additional input in the processor to monitor the auxiliary obstruction sensor. This presents drawbacks for engines already in use whose processor inputs are already linked to other engine sensors and that are not available for an auxiliary obstruction sensor.

Furthermore, this requires the provision of an electrical lead to connect the auxiliary obstruction sensor to the processor, which also affects the mass and the cost of the engine.

In order to eliminate at least some of these drawbacks, the invention relates to a device for monitoring the obstruction of at least two fluid filters of a fluid circulation system of a gas turbine engine of an aircraft, the device comprising:

a first obstruction sensor, intended to monitor a first fluid filter, set up to send a first detection signal of an obstruction of the first filter;

a processor comprising a monitoring input linked to said first sensor to measure the first detection signal;

the device also comprising a second obstruction sensor, intended to monitor a second fluid filter, set up to send a second detection signal of an obstruction of the second filter, said monitoring input of the processor being connected to the second obstruction sensor to measure said second detection signal.

The invention enables the second detection signal to be measured directly by the monitoring input that is already measuring the first detection signal. Thus, contrary to the assumption requiring the person skilled in the art to connect a single sensor per processor input, the signals from the sensors are read over a single processor input.

Preferably, the first detection signal being sent over a first predetermined variation range and the second detection signal being sent over a second predetermined variation range, distinct from said first variation range, the processor is set up such as to identify the obstruction of one of the fluid filters as a function of the variation range of the signal measured at its monitoring input.

The variation range of the signal received at the monitoring input advantageously makes it possible to distinguish the first detection signal from the second detection signal. The processor can therefore precisely identify which of the fluid filters is obstructed.

According to a variant, the second obstruction sensor is linked to the first obstruction sensor such that the second detection signal from the second obstruction sensor is incorporated into the first detection signal of the first obstruction sensor. Thus, the input of the processor is linked indirectly to the second sensor via the first sensor. The first detection signal advantageously makes it possible to indicate an obstruction of the first filter and/or of the second filter.

Preferably, the first obstruction sensor is a Wheatstone bridge comprising at least one strain gauge resistor, the second obstruction sensor being connected in parallel with said strain gauge resistor. Advantageously, the second detection sensor unbalances the Wheatstone bridge in the event of obstruction. An obstruction of the second filter then results in an obstruction signal that is different from the obstruction signal of the first filter. Advantageously, as the second sensor is connected to the first sensor, it is not necessary to provide an electrical lead to connect the second sensor to the processor.

Also preferably, the second obstruction sensor is a passive sensor and comprises, preferably, an electrical contact. Such a sensor advantageously has a low cost and is compact.

Also preferably, the second obstruction sensor is an active sensor, preferably, a proximity sensor that precisely indicates the degree of obstruction of the second filter.

According to a variant, the device comprises a fusion block of said detection signals set up to:

receive as an input the first detection signal from the first obstruction sensor and the second detection signal from the second obstruction sensor;

send the first detection signal and the second detection signal alternately to the monitoring input of the processor.

Advantageously, the signal sent by the fusion block and received by the monitoring input of the processor is a hybrid signal comprising alternately the two detection signals, said signals preferably being multiplexed.

Preferably, the second obstruction sensor is a Wheatstone bridge. This advantageously makes it possible to continuously measure the degree of obstruction of the second filter using a hybrid signal comprising alternately the two detection signals.

BRIEF DESCRIPTION OF THE SEVERAL VIEWS OF THE DRAWINGS

Other characteristics and advantages of the invention are given in the description below with reference to the drawing attached by way of non-limiting examples in which.

DETAILED DESCRIPTION OF THE INVENTION

Figure 1:
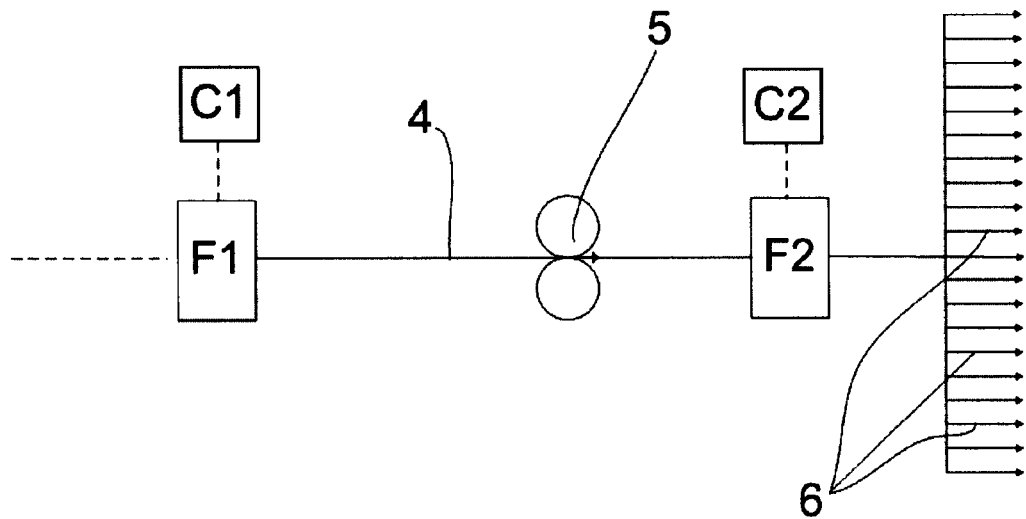
FIG. 1 is a schematic diagram of a hydraulic fuel supply system of an engine comprising a main fuel filter and an auxiliary fuel filter which are each monitored by an obstruction sensor.

A hydraulic fuel supply system 4 of a gas turbine engine of an aircraft is shown schematically in FIG. 1. The hydraulic system 4, in which the fuel circulates, comprises a main fuel filter F1, a pump 5 and an auxiliary fuel filter F2 in series to supply a plurality of injectors 6. For the sake of clarity, the hydraulic fuel supply system has been simplified, naturally the hydraulic system 4 may include other elements such as pumps, heat exchangers and valves.

With reference to FIG. 1, the first filter F1 is a main filter, as described previously, and is larger than the second filter F2, known as the auxiliary filter. On account of its size, the main filter F1 is designed to filter more of the fuel than the auxiliary filter F2. In this example, the main filter F1 is connected upstream of the auxiliary filter F2 but naturally it could also be connected downstream.

The main fuel filter F1 and the auxiliary fuel filter F2 are respectively monitored by a main obstruction sensor C1 and an auxiliary obstruction sensor C2. Each obstruction sensor C1, C2 is set up to monitor the state of obstruction of the filters F1, F2.

The main and auxiliary obstruction sensors C1, C2 are respectively set up to send main and auxiliary detection signals S1, S2.

Figure 2:
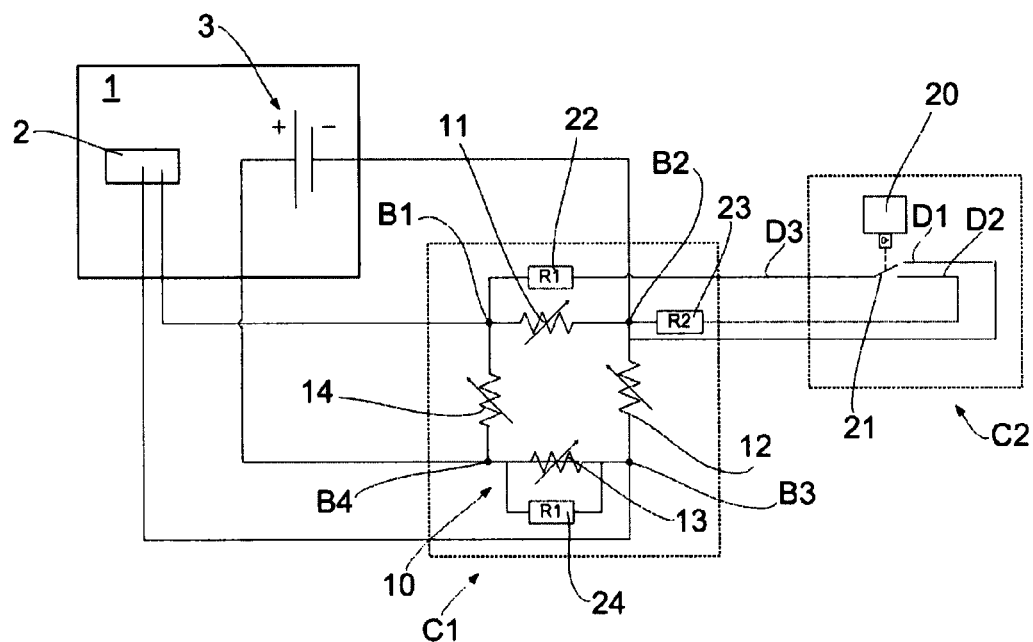
FIG. 2 is a schematic diagram of a first embodiment of the monitoring device according to the invention with two obstruction sensors.
Figure 3:
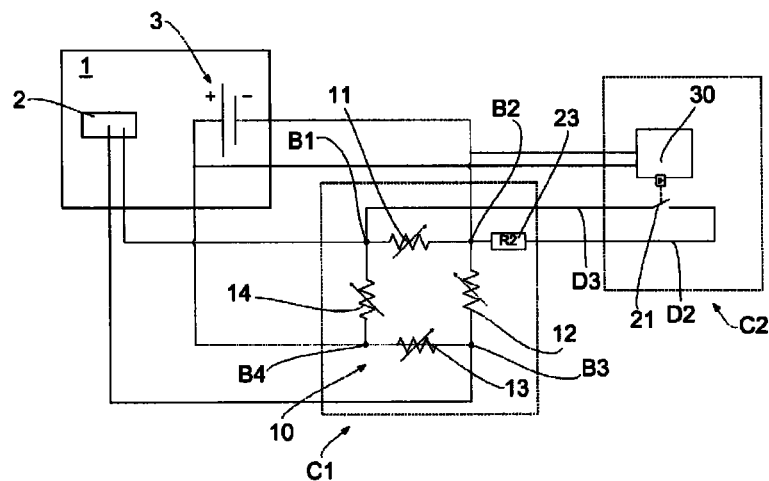
FIG. 3 is a schematic diagram of a second embodiment of the monitoring device according to the invention with two obstruction sensors.
Figure 4:
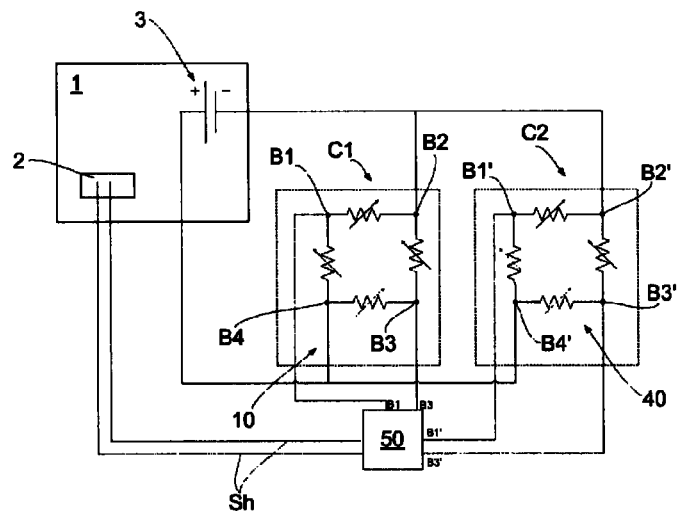
FIG. 4 is a schematic diagram of a third embodiment of the monitoring device according to the invention with two obstruction sensors and a fusion block of the detection signals.

To globally monitor the obstruction of the fuel filters F1, F2, the gas turbine engine includes a monitoring device comprising the obstruction sensors C1, C2 and a FADEC-type processor 1 as presented above, comprising an obstruction monitoring input 2 to which are connected said obstruction sensors C1, C2 as shown in FIGS. 2 to 4.

Also with reference to FIGS. 2 to 4, the first obstruction sensor C1 includes a deformable membrane to which is connected a Wheatstone bridge 10 comprising four strain gauge resistors 11-14 forming a series circuit. The terminals B1-B4 between each of the strain gauge resistors 11-14 are defined as shown in FIGS. 2 to 4. The strain gauge resistors 11-14 detect the differential pressure on the terminals of the membrane of the main fuel sensor C1 according to a method known to the person skilled in the art.

In the embodiments of the invention, the Wheatstone bridge 10 is powered by a power supply 3 of the processor 1 such as to impose a potential difference between the diametrically opposed terminals B2, B4 of the Wheatstone bridge 10. Henceforth, the terminals B2, B4 shall be referred to as power terminals.

In a known manner, the monitoring input 2 of the processor 1 is connected to two diametrically opposed terminals of the Wheatstone bridge 10, referenced B1, B3 in FIGS. 2-4, such as to measure the electric potential difference between the terminals B1, B3 i.e. an electrical voltage. Henceforth, the terminals B1, B3 shall be referred to as measurement terminals. The electrical voltage measured between the measurement terminals B1, B3 constitutes the detection signal S1 of the main obstruction sensor C1. For a given Wheatstone bridge, the detection signal S1 varies within a predetermined variation range P1. In this example, the detection signal S1 varies between 0 and 100 mV.

When the main fuel filter F1 is in use, the membrane of the obstruction sensor C1 is deformed which causes a variation in the value of the strain gauge resistors and consequently a variation in the voltage S1 measured by the processor 1, the voltage S1 always varying within the predetermined variation range P1. When the main fuel filter F1 is obstructed, the voltage S1 measured by the processor 1 is characteristic (for example: 50 mV). The alarm indicating obstruction of the main fuel filter F1 is stored in the processor 1 or sent to the pilot of the aircraft so that the main fuel filter F1 can be replaced during the next maintenance operation.

With reference to FIGS. 2 to 4, the auxiliary fuel filter F2 is monitored by an auxiliary obstruction sensor C2 that may be present in different forms. The auxiliary obstruction sensor C2 is linked to the monitoring input 2 of the processor 1 to detect an obstruction of the auxiliary fuel filter F2 and ensure it is replaced when necessary.

According to a first embodiment of the invention, with reference to FIG. 2, the auxiliary obstruction sensor C2 includes an electrical contact 20, known to the person skilled in the art by its English name "switch", set up to detect an obstruction of the auxiliary fuel filter F2. A sensor C2 with an electrical contact 20 has the advantage of being passive which, by definition, does not need to be powered. Its production cost is low.

Also with reference to FIG. 2, the Wheatstone bridge 10 of the main obstruction sensor C1 includes an auxiliary electrical circuit connected between the measurement terminal B1, which is connected to the monitoring input 2, and the power terminal B2 that receives an electrical potential from the power supply 3 of the processor 1. In other words, the auxiliary electrical circuit is connected in parallel with the strain gauge resistor 11 of the Wheatstone bridge 10.

The auxiliary electrical circuit has a main channel D3, connected to the measurement terminal B1, two link channels D1, D2, both connected to the power terminal B2, and an electrical contact 21, in this case a controlled switch, set up such as to connect the main channel D3 either to the first link channel D1 or to the second link channel D2.

The main channel D3 of the auxiliary electrical circuit includes a current limiting resistor 22, of value R1, set up such as to protect said circuit in the event of a short circuit. The current limiting resistor 22 is connected between the measurement terminal B1 and a first terminal of the electrical contact 21.

A balance resistor 24, of value R1, is connected in parallel with the strain gauge resistor 13 of the Wheatstone bridge 10 which is diametrically opposite the strain gauge resistor 11 to which the auxiliary electrical circuit is connected. In other words, the balance resistor is connected between the measurement terminal B3 and the power terminal B4.

The first link channel D1 is connected directly to the second power terminal B2 of the strain gauge resistor 11 while the second link channel D2 comprises an obstruction resistor 23, of value R2, connected between the power terminal B2 and a second terminal of the electrical contact 21. As a function of the control of the electrical contact 21, the total resistance value connected in parallel with the strain gauge resistor 11 varies, the global resistance being either the current limiting resistor 22 when the first link channel D1 is connected, or the current limiting resistor 22 (R1) and the obstruction resistor 23 (R1+R2) when the second link channel D2 is connected.

The electrical contact 21 is controlled by the obstruction sensor C2 such that in the event of obstruction, the contact 21 is switched to the second link channel D2, the contact 21 remaining on the first link channel D1 if the auxiliary fuel filter F2 is not obstructed.

In other words, in the absence of obstruction, the current limiting resistor 22 and the balance resistor 24 are respectively connected to the terminals of the strain gauge resistor 11 and of the related strain gauge resistor 13. As the current limiting resistor 22 and the balance resistor 24 have the same values R1, the Wheatstone bridge 10 is balanced.

If the auxiliary fuel filter F2 is obstructed, the total resistance value (R1+R2) connected in parallel with the strain gauge resistor 11 is greater than the value of the balance resistor 24 (R1) which changes the electrical potentials at the measurement points. The Wheatstone bridge 10 is then unbalanced. The processor 1, via its monitoring input 2, detects at the measurement terminals B1, B3 an abnormally high output voltage and deduces from this an obstruction of the auxiliary filter F2.

The monitoring device according to the invention causes the bridge to become unbalanced if an obstruction of the auxiliary fuel filter F2 is detected. Advantageously, the processor 1 can detect an obstruction of the auxiliary fuel filter F2 by monitoring the main sensor C1 only. The auxiliary detection signal S2 is thereby incorporated into the main detection signal S1.

In other words, the obstruction of the second filter results, from the point of view of the processor, in an obstruction signal of the first filter. As a general rule, the detection of an obstruction of one of the filters is sufficient, with identification of the obstructed filter not being necessary.

Preferably, in order to distinguish an obstruction of the main fuel filter F1 from an obstruction of the auxiliary fuel filter F2, the value R2 of the obstruction resistor 23 is chosen such that an obstruction of the auxiliary fuel filter F2 generates an electrical voltage between the measurement terminals B1, B3 that falls within a variation range P2 that is different to that of the main obstruction sensor C1. By way of example, the variation range of the detection signal is between 100 mV and 200 mV in the event of obstruction of the second filter F2.

In other words, the obstruction of the second filter results, from the point of view of the processor, in an obstruction signal of the second filter sent by the sensor of the first filter. The obstructed filter can then be identified as a function of the signal received at the input of the processor 1.

Thus, advantageously, the processor 1 with a single monitoring input 2 monitors, firstly, the deformation of the membrane of the obstruction sensor C1 of the main filter F1 over a variation range P1 and, secondly, an obstruction of the auxiliary filter F2 if the electrical voltage measured falls within a variation range P2 that is different from the variation range P1. No additional input is required on the processor 1.

In other words, the processor 1 measures a degree of obstruction of the first sensor C1 (continuous information) and the state of obstruction of the second sensor C2 (binary information).

A second embodiment of the invention is described with reference to FIG. 3. The references used to describe elements having identical, equivalent or similar function or structure to the elements in FIG. 2 are the same, to simplify the description. Furthermore, the entire description of the embodiment of FIG. 2 is not reproduced, this description applying to elements of FIG. 3 where not incompatible. Only notable, structural and functional differences are described.

With reference to FIG. 3, the auxiliary fuel filter F2 is monitored by an obstruction sensor C2 in the form of a proximity sensor 30, known to the person skilled in the art, set up to detect an obstruction of the auxiliary fuel filter F2.

The proximity sensor 30, similarly to the sensor comprising an electrical contact 20 according to the first embodiment, is set up to detect an obstruction of the auxiliary fuel filter F2. The advantage of a proximity sensor 30 is to enable the more precise detection of the obstruction. However, it needs to be powered. To limit its footprint, the proximity sensor 30 is powered by the power supply 3 of the processor 1.

Also with reference to FIG. 3, the auxiliary electrical circuit has a main channel D3 connected to the measurement terminal B1, a single link channel D2 connected to the power terminal B2, and an electrical contact 21 set up such as to connect or disconnect the main channel D3 of the single link channel D2. The main channel D3 does not include any resistors in this case, the single link channel D2 having an obstruction resistor 23 of value R2. Furthermore, no resistor is connected in parallel with the related strain gauge resistor 13.

The electrical contact 21 is controlled by the proximity sensor 30 such that the contact 21 is closed in the case of obstruction of the auxiliary fuel filter F2 and open in the opposite case.

If there is no obstruction, the Wheatstone bridge 10 is balanced, the strain gauge resistors 11, 13 not being modified.

If the auxiliary fuel filter F2 is obstructed, the obstruction resistor 23 is connected in parallel with the strain gauge resistor 11 which changes the electrical potentials at the measurement points. The Wheatstone bridge 10 is then unbalanced. The processor 1, via its monitoring input 2, detects at the measurement terminals B1, B3 an abnormally high output voltage and deduces from this an obstruction of the auxiliary filter F2.

Similar to the first embodiment of the invention, the Wheatstone bridge is unbalanced in the event of detection of an obstruction of the auxiliary fuel filter F2. Advantageously, the processor 1 can detect an obstruction of the auxiliary fuel filter F2 by monitoring the main sensor C1 only. The auxiliary detection signal S2 is thereby incorporated into the main detection signal S1.

An auxiliary circuit with a single link channel and no balance resistor has been presented here, but naturally the auxiliary circuit of the first embodiment could also work with an electrical contact controlled by a proximity sensor 30. Furthermore, the auxiliary circuit of the second embodiment could also naturally work with an electrical contact controlled by an obstruction sensor 20.

A third embodiment of the invention is described with reference to FIG. 4. The references used to describe elements having identical, equivalent or similar function or structure to the elements in FIG. 2 are the same, to simplify the description. Furthermore, the entire description of the embodiment of FIG. 1 is not reproduced, this description applying to elements of FIG. 4 where not incompatible. Only notable, structural and functional differences are described.

With reference to FIG. 4, the auxiliary fuel filter F2 is monitored by an obstruction sensor C2 in the form of a Wheatstone bridge 40 similar to the one in the main obstruction sensor C1 of the main fuel filter F1, this bridge being referred to hereinafter as the auxiliary bridge 40 as opposed to the main bridge 10 of the first obstruction sensor C1. The fuel filters F1, F2 are monitored by two identical or similar sensors C1, C2, which reduces the production and maintenance costs of the device.

Each bridge 10, 40 is powered by the power supply 3 of the processor 1 such as to impose a potential difference between the power terminals of the bridges 10, 40. With reference to FIG. 4, the main bridge 10 is powered at its power terminals B2, B4 while the auxiliary bridge 40 is powered at its power terminals B2', B4'.

According to this third embodiment of the invention, the monitoring device comprises a fusion block 50 set up firstly to receive the main obstruction detection signal S1 and the auxiliary obstruction detection signal S2 as an input and secondly to send a hybrid detection signal as an output to the surveillance input 2 of the processor 1.

As shown in FIG. 4, the fusion block 50 is connected to the measurement terminals B1, B3 and B1', B3' of the bridges 10, 40 such as to receive the obstruction detection signals S1, S2.

The fusion block 50 is set up to process the detection signals S1, S2 such as to form a single hybrid signal Sh which is sent to the input 2 of the processor 1, the hybrid signal Sh comprising alternately the first detection signal S1 and the second detection signal S2.

Preferably, the fusion block 50 is set up to multiplex the main detection signal S1 with the auxiliary detection signal S2, the multiplexed signal being the hybrid signal Sh. Thus, the main and auxiliary detection signals S1, S2 are alternately sent by the fusion block 50 in the hybrid signal Sh.

Preferably, the fusion block 50 is set up to condition each of the detection signals S1, S2 such as to vary them over two different variation ranges P1, P2 (for example: 0-100 mV and 100-200 mV). Thus, when the processor 1 receives the hybrid signal Sh, it can identify the detection signal received as a function of the variation range of said signal.

According to this embodiment, the processor 1 continuously measures the deformation of the membranes of each obstruction sensor C1, C2. This makes it possible to dynamically determine the state of a filter at a given moment.

Unlike the previous embodiments in which the degree of obstruction of the first filter was measured continuously and the state of the second filter was measured "binarily" (obstructed filter/unobstructed filter), this third embodiment of the invention makes it possible to continuously measure the degrees of obstruction of both filters F1, F2.

This third embodiment of the invention has been presented here with Wheatstone bridges 10, 40 but naturally other obstruction sensors could also work, such as proximity sensors.

In the three embodiments of the invention of FIGS. 2 to 4, the monitoring device has been presented with two obstruction sensors C1, C2 but naturally the invention also applies to a system comprising more than two obstruction sensors.

Figure 5:
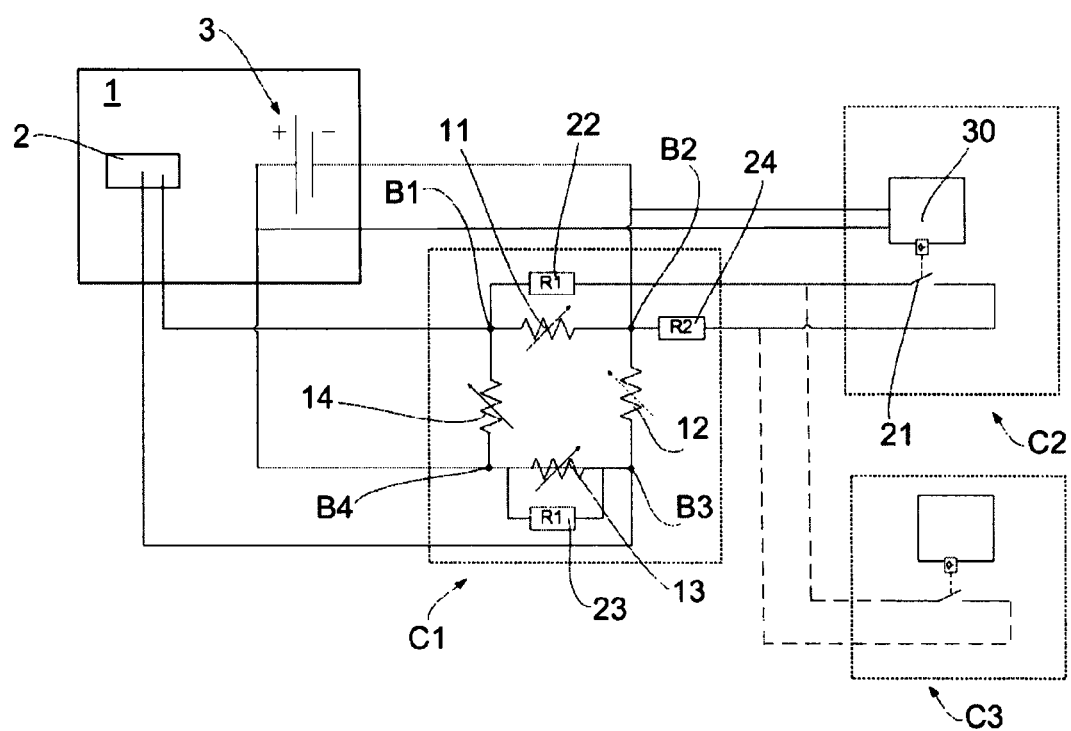
FIG. 5 is a schematic diagram of a second embodiment of the monitoring device in FIG. 3 with three obstruction sensors.

By way of example, with reference to FIG. 5 showing a device according to the second embodiment of the invention with three sensors C1-C3, the third obstruction sensor C3 is connected in parallel with the second obstruction sensor C2 and sends a detection signal S3. Thus, the detection of an obstruction by the sensors C2 or C3 unbalances the Wheatstone bridge of C1, which makes it possible to identify an obstruction. Preferably, the fusion block 50 is set up to condition each of the detection signals S1, S2, S3 such as to vary them over three different variation ranges P1, P2, P3 (for example: 0-100 mV, 100-200 mV, 200-300 mV).

The invention has been presented above for a hydraulic system in which fuel circulates but the invention applies to all hydraulic systems of an aircraft such as, for example, a hydraulic system with lubricating oil.

The invention claimed is:

1. A device for monitoring an obstruction of at least two fluid filters of a fluid circulation system of a gas turbine engine of an aircraft, the device comprising:
    a first obstruction sensor to monitor a first fluid filter, and set up to send a first detection signal of an obstruction of the first filter, the first obstruction sensor including a Wheatstone bridge comprising at least one strain gauge resistor;
    a processor comprising a monitoring input linked to said first sensor to measure the first detection signal; and
    a second obstruction sensor to monitor a second fluid filter, and set up to send a second detection signal of an obstruction of the second filter, said monitoring input of the processor being connected to the second obstruction sensor to measure said second detection signal, the second obstruction sensor being connected in parallel with said strain gauge resistor;
    wherein the first detection signal is sent over a first predetermined variation range, the second detection signal is sent over a second predetermined variation range, distinct from said first variation range, and the processor is set up to identify the obstruction of one of the fluid filters as a function of one of the variation ranges of the first and second detection signals measured at the monitoring input.

2. The device according to claim 1, wherein the second obstruction sensor is linked to the first obstruction sensor such that the second detection signal from the second obstruction sensor is incorporated into the first detection signal of the first obstruction sensor.

3. The device according to claim 1, wherein the second obstruction sensor is a passive sensor and comprises an electrical contact.

4. The device according to claim 1, wherein the second obstruction sensor is a proximity sensor.

5. A device for monitoring an obstruction of at least two fluid filters of a fluid circulation system of a gas turbine engine of an aircraft, the device comprising:
    a first obstruction sensor to monitor a first fluid filter, and set up to send a first detection signal of an obstruction of the first filter;
    a processor comprising a monitoring input linked to said first sensor to measure the first detection signal;
    a second obstruction sensor to monitor a second fluid filter, and set up to send a second detection signal of an obstruction of the second filter, said monitoring input of the processor being connected to the second obstruction sensor to measure said second detection signal; and
    a fusion block of said detection signals set up to
        receive as an input the first detection signal from the first obstruction sensor and the second detection signal from the second obstruction sensor; and
        send the first detection signal and the second detection signal alternately to the monitoring input of the processor, wherein the first detection signal is sent over a first predetermined variation range, the second detection signal is sent over a second predetermined variation range, distinct from said first variation range, and the processor is set up to identify the obstruction of one of the fluid filters as a function of one of the variation ranges of the first and second detection signals measured at the monitoring input.

6. The device according to claim 5, wherein the second obstruction sensor is a Wheatstone bridge.

* * * * *